US010705223B2

(12) United States Patent
Manohar et al.

(10) Patent No.: US 10,705,223 B2
(45) Date of Patent: Jul. 7, 2020

(54) LOW POWER ASYNCHRONOUS GPS BASEBAND PROCESSOR (71) Applicant: Cornell University, Ithaca, NY (US)

(72) Inventors: Rajit Manohar, New York, NY (US); Benjamin Tang, Ithaca, NY (US); Stephen Longfield, Ithaca, NY (US); Sunil A. Bhave, Ithaca, NY (US)

(73) Assignee: Cornell University, Ithica, NY (US)

( * ) Notice: Subject to any disclaimer, the term of this patent is extended or adjusted under 35 U.S.C. 154(b) by 0 days.

(21) Appl. No.: 16/190,001

(22) Filed: Nov. 13, 2018

(65) Prior Publication Data

US 2019/0317222 A1    Oct. 17, 2019

Related U.S. Application Data (63) Continuation of application No. 14/380,700, filed as application No. PCT/US2013/027611 on Feb. 25, 2013, now Pat. No. 10,126,428.

(60) Provisional application No. 61/602,145, filed on Feb. 23, 2012.

(51) Int. Cl.
G01S 19/24    (2010.01)
G01S 19/34    (2010.01)
G01S 19/37    (2010.01)

(52) U.S. Cl.
CPC .............. G01S 19/24 (2013.01); G01S 19/34 (2013.01); G01S 19/37 (2013.01)

(58) Field of Classification Search
CPC ......... G01S 19/09; G01S 19/24; G01S 19/34; G01S 19/37; G01S 19/29; G01S 19/30

USPC ..................................................... 342/357.63
See application file for complete search history.

(56) References Cited

U.S. PATENT DOCUMENTS

| 5,459,473 | A | * | 10/1995 | Dempster | G01S 19/09 342/357.25 |
| 5,982,811 | A | * | 11/1999 | Harrison | G01S 5/0027 375/150 |
| 6,078,290 | A | * | 6/2000 | McBurney | G01S 19/09 342/357.31 |
| 6,133,871 | A | * | 10/2000 | Krasner | G01S 19/05 342/357.74 |
| 6,437,734 | B1 | * | 8/2002 | McBurney | G01S 5/0018 342/357.62 |
| 2010/0194635 | A1 | * | 8/2010 | An | G01S 19/24 375/147 |
| 2011/0261805 | A1 | * | 10/2011 | Landry, Jr. | G01S 19/24 370/342 |
| 2015/0022397 | A1 | | 1/2015 | Manohar et al. | |

FOREIGN PATENT DOCUMENTS

CN    102360080 A    2/2012

OTHER PUBLICATIONS

Office Action for European Patent Application No. 13751427.9, dated Nov. 21, 2017, 5 pages.
(Continued)

Primary Examiner — Dao L Phan
(74) Attorney, Agent, or Firm — Perkins Coie LLP (57) ABSTRACT Asynchronous Global Positioning System (GPS) baseband processor architectures with a focus on minimizing power consumption. All subsystems run at their natural frequency without clocking and all signal processing is done on-the-fly.

6 Claims, 9 Drawing Sheets (56) References Cited

OTHER PUBLICATIONS

Hassoun, S. et al., "Guest editors' introduction: clockless VLSI systems", IEEE Design & Test of Computers, vol. 20, No. 6, Nov. 1, 2003, pp. 5-8.
Office Action for Japanese Patent Application No. 2014558924, dated Jan. 6, 2017.
Kang, Sung Chul, Authorized Officer, Korean Intellectual Property Office, International Search Report and Written Opinion, International Application No. PCT/US2013/027611, dated Jun. 26, 2013, 12 pages.
Bink, A. et al., "ARM996HS: The First Licensable, Clockless 32-Bit Processor Core", IEEE Micro, vol. 27, No. 2, Mar. 1, 2007, pp. 58-68.
European Patent Office, European Search Report, European Patent Application No. 13751427.9, dated Oct. 7, 2015, 6 pages.

\* cited by examiner

PRIOR ART

LOW POWER ASYNCHRONOUS GPS BASEBAND PROCESSOR

CROSS REFERENCE TO RELATED APPLICATIONS

This patent document is a divisional of U.S. patent application Ser. No. 14/380,700 entitled "LOW POWER ASYNCHRONOUS GPS BASEBAND PROCESSOR" filed on Aug. 22, 2014, which is a 35 U.S.C. § 371 National Stage application of International Application No. PCT/US2013/027611 entitled "LOW POWER ASYNCHRONOUS GPS BASEBAND PROCESSOR" filed Feb. 25, 2013, which claims the priority of U.S. Provisional Application No. 61/602,145 entitled "LOW POWER ASYNCHRONOUS GPS BASEBAND PROCESSOR" filed on Feb. 23, 2012. The entire disclosures of the above applications are incorporated by reference as part of this document.

BACKGROUND

A typical GPS receiver consists of an RF front end and a digital signal processor (DSP). The RF front end receives the GPS signal from the satellites, mixes it down to an intermediate frequency, and samples it.

The DSP acquires a lock to multiple GPS satellite signals present in the front end samples and tracks variations in the signals over time. While the DSP tracks variations in the signal, it also extracts information from it that can be used to compute the current position and time—the "navigation solution."

Our lives are increasingly being affected by the use of GPS technology. We rely on GPS to navigate from one place to another, to locate a person or an object, to provide time synchronization in our telecommunication networks and power grids, and in many other every day applications. Today, high power consumption of existing GPS receiver chips can cause overheating issues, and can limit continuous GPS operation in mobile devices. It is clear that the high power consumption in GPS receivers must be addressed to pave the way for advances in areas such as location-aware applications and micro robotics navigation.

Significant research effort has been devoted to reducing the power consumption of the RF front end, with current designs having power consumption of less than 10 mW. However, more work needs to be done to lower the power consumption of the GPS baseband processor.

A powerful DSP can perform all baseband processing in software. This approach is highly reconfigurable and easy to develop and debug but not suitable for low power applications. An alternative is to use a hardware correlation engine to handle the fast correlation operations and a microprocessor to handle the rest of the signal processing tasks. For these approaches, more work also needs to be done to lower the power consumption of the GPS baseband processor.

There is a need for GPS chip designs with low power consumption.

BRIEF SUMMARY

Systems and methods are disclosed herein for an asynchronous Global Positioning System (GPS) baseband processor architecture designed with a combination of Quasi-Delay-Insensitive (QDI) and bundled-data techniques, with a focus on minimizing power consumption. All subsystems run at their natural frequency without clocking and all signal processing is done on-the-fly. Transistor-level simulations show that an embodiment of the system of these teachings consumes only 1.4 mW with position 3-D rms error below 4 meters, comparing favorably to other contemporary GPS baseband processors.

In one or more embodiments, the asynchronous global positioning system (GPS) channel baseband processor of these teachings includes an asynchronous acquisition subsystem configured to obtain code offset and Doppler frequency estimates, the asynchronous acquisition subsystem receiving input from an RF front end; the asynchronous acquisition subsystem processing signals of a first frequency, an asynchronous tracking subsystem configured to track deviations in the code offset and Doppler frequency; the asynchronous tracking subsystem receiving data for code offset and Doppler frequency estimates; the asynchronous tracking subsystem processing signals of a second frequency, an asynchronous downsampling component receiving an output from the asynchronous tracking subsystem and configured for downsampling the output of the asynchronous tracking subsystem down to the navigation data sampling rate, and an asynchronous decoding subsystem receiving output from the asynchronous downsampling component and providing GPS satellite time and code start time information; the asynchronous decoding subsystem processing signals of a third frequency; wherein the asynchronous acquisition subsystem, the asynchronous tracking subsystem, the asynchronous downsampling component and the asynchronous decoding subsystem operate at a natural frequency for each without clocking.

In other embodiments, the asynchronous global positioning system (GPS) channel baseband processor of these teachings includes a number of channel units, each channel unit having an asynchronous acquisition subsystem configured to obtain code offset and Doppler frequency estimates, the asynchronous acquisition subsystem receiving input from an RF front end and processing signals of a first frequency, an asynchronous downsampling component receiving an output from an asynchronous tracking subsystem and configured for downsampling the output of the asynchronous tracking subsystem down to the navigation data sampling rate and an asynchronous decoding subsystem receiving output from the asynchronous downsampling component and providing GPS satellite time and code start time information; said asynchronous decoding subsystem processing signals of a third frequency; wherein said asynchronous acquisition subsystem, said asynchronous tracking subsystem, said asynchronous downsampling component and said asynchronous decoding subsystem operate at a natural frequency for each without clocking. In those other embodiments, the system also includes one or more one arbitrated multiplexers receiving data for code offset and Doppler frequency estimates for each of the number of channels, an asynchronous tracking subsystem configured to track the code offset and Doppler frequency, the asynchronous tracking subsystem receiving data for code offset and Doppler frequency estimates for one channel from said at least one arbitrated multiplexer and processing signals of a second frequency, and one or more demultiplexers receiving the output from the asynchronous tracking subsystem and distributing the output to one channel.

In one or more embodiments, the method of these teachings for clockless GPS baseband processing includes:
(a) receiving an input signal for one channel from an RF front end; and
(b) providing the input signal to a code numerically controlled oscillator (NCO) and a carrier NCO;

(c) using overflows in the code NCO to mark a predetermined code period, thereby forming an accumulation interval and referencing time to sampling in the input signal;

(d) obtaining, from output of the carrier NCO and the code NCO, early, prompt and late phase and quadrature accumulations;

(e) obtaining code offset and Doppler frequency estimates for the one channel;

(f) tracking deviations in code offset and Doppler frequency for the one channel, using the early, prompt and late phase and quadrature accumulations, (g) obtaining GPS satellite time and code start time from code offset and Doppler frequency information and the input signal; and (h) repeating steps (a)-(g) until all channels have been processed; wherein all steps are performed asynchronously.

Other embodiments are also disclosed.

Asynchronous techniques enable very low-power designs, especially in systems where the rate of required throughput may vary over time. As a GPS system involves several different components, each of which compute at a different natural frequency, an asynchronous design of these teachings can lead to benefits in power consumption for baseband processing.

For a better understanding of the present teachings, together with other and further needs thereof, reference is made to the accompanying drawings and detailed description and its scope will be pointed out in the appended claims.

BRIEF DESCRIPTION OF THE DRAWINGS

FIGS. 7a-7b show results of a Tracking sensitivity test; and

DETAILED DESCRIPTION

The present disclosure will be more completely understood through the following description, which should be read in conjunction with the drawings. In this description, like numbers refer to similar elements within various embodiments of the present disclosure. Within this description, the claims will be explained with respect to embodiments. The skilled artisan will readily appreciate that the methods, apparatus and systems described herein are merely exemplary and that variations can be made without departing from the spirit and scope of the disclosure.

As used herein, the singular forms "a," "an," and "the" include the plural reference unless the context clearly dictates otherwise.

Except where otherwise indicated, all numbers expressing quantities, conditions, and so forth used in the specification and claims are to be understood as being modified in all instances by the term "about."

Before describing the present teachings in detail, certain terms are defined herein for the sake of clarity.

A "chip," as used herein, is a pulse of a direct-sequence spread spectrum (DSSS) code, such as a pseudo-noise code sequence used in direct-sequence code division multiple access (CDMA) channel access techniques.

A "chip or chipping rate," as used herein, of a code is the number of pulses per second (chips per second) at which the code is transmitted (or received).

CHP (Communicating Hardware Processes), as used herein, is a CSP (Communicating Sequential Processes)-like language used to model asynchronous circuits.

Quasi Delay-Insensitive (QDI) circuits, as used herein, are a class of almost delay-insensitive asynchronous circuits.

In some instances, the present teachings relate to addressing the power consumption issue in the baseband processor when continuous position information is required. Instead of using a single DSP or a correlation engine with software support to perform baseband processing, the present teachings include a hybrid architecture that decouples crucial GPS receiver operations from other post-processing that can either be managed locally by a co-processor or be separately managed by the cloud or base station.

The system of these teachings performs all baseband processing on-the-fly in hardware, leaving only initialization and navigation solution computation to software. This approach not only provides an optimized hybrid hardware and software solution but is also ideal for applications that need to deploy ultra-low-power mobile GPS receivers that transmit just enough +information back to a base station to compute its position and time information.

Moreover, the clockless data-flow driven baseband processor of these teachings can be paired with any conventional GPS L1 RF front end.

The baseband processor of these teachings is programmable to support different front end sampling and intermediate frequencies and mixing scheme.

In order to aid in the understanding of these teachings, background information on GPS signal structure is provided below.

The GPS uses spread-spectrum signaling to modulate a carrier with ranging codes. This technique allows a GPS receiver to use Code Division Multiple Access (CDMA) to uniquely identify the signal from each satellite by the satellite's unique ranging code. Modern GPS satellites transmit signals at the L1, L2 and L5 carrier frequencies with civil and military codes. Since our system is designed to process the L1 civil signal, the signal structure is described hereinbelow.

Figure 1:
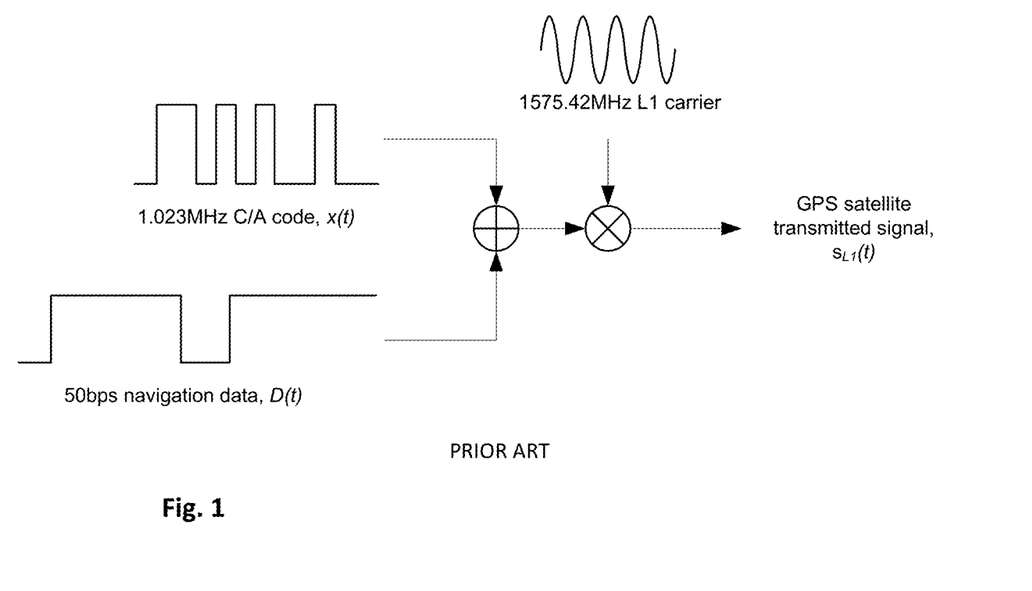
FIG. 1 is a graphical representation of conventional GPS signal structure.

The GPS L1 Coarse/Acquisition (C/A) signal consists of a 1575.42 MHz L1 carrier signal modulated by a periodic 1023-chip C/A ranging code at 1.023 Mbps, which in turn is modulated by the 50 bps navigation data as shown in FIG. 1. The C/A ranging code has a period of 1 ms and is selected from a special class of pseudorandom noise (PRN) sequences known as Gold codes. Each satellite can be identified by its unique Gold code. The navigation data is a sequence of bits that carries satellite orbital information, satellite time and error correction parameters [8]. The L1

C/A signal, transmitted with an average power of $P_{L1}$, from a GPS satellite can be represented mathematically as $$s_{L1}(t) = \sqrt{2P_{L1}} D(t) \times (t) \cos(2\pi f_{L1} t + \theta_{Tx}) \quad (1)$$

where D is the navigation data; x is the C/A code and $f_{L1}$ the L1 carrier frequency.

The signal from a particular satellite reaches the receiver's RF front end after some transmission delay. This difference in time of flight of the signals from different satellites to the receiver forms the fundamentals of radionavigation on which the GPS system is based. Additional uncertainties in the received signal are introduced by the receiver's front end oscillator error, and the Doppler frequency shift due to the relative movement of the satellite and the receiver. The receiver must compensate for these uncertainties so that a correct navigation solution can be computed.

The GPS antenna captures the GPS signals in view; the signals then pass through the receiver's RF front end and are sampled and, in some instances, down-converted to a proper intermediate frequency (IF) (1-20 MHz).

The GPS baseband processor's role is to first acquire a rough estimate of the transmission delay and Doppler frequency shift for each available satellite and then refine the estimates through tracking loops. A delay-locked loop (DLL) tracks deviations in the estimate of the transmission delay whereas a frequency-locked loop (FLL) or a phase-locked loop (PLL) tracks deviations in the Doppler frequency estimate.

It is important to realize that the signal in (1), after conditioning by the front end, consists of several signals with different intrinsic frequencies, the fastest of which is the RF front end ADC sampling rate, followed by the 1 ms PRN code period in x, and finally the 20 ms navigation data rate in D.

Hereinbelow, a description of how the system of these teachings exploits these properties when processing the signal to produce navigation solution, and in some embodiments, with the objective of minimizing power consumption while optimizing performance, is described.

In one or more embodiments, the asynchronous global positioning system (GPS) channel baseband processor of these teachings includes an asynchronous acquisition subsystem configured to obtain code offset and Doppler frequency estimates, the asynchronous acquisition subsystem receiving input from an RF front end; the asynchronous acquisition subsystem processing signals of a first frequency, an asynchronous tracking subsystem configured to track deviations in the code offset and Doppler frequency; the asynchronous tracking subsystem receiving data for code offset and Doppler frequency estimates; the asynchronous tracking subsystem processing signals of a second frequency, an asynchronous downsampling component receiving an output from the asynchronous tracking subsystem and configured for downsampling the output of the asynchronous tracking subsystem down to the navigation data sampling rate, and an asynchronous decoding subsystem receiving output from the asynchronous downsampling component and providing GPS satellite time and code start time information; the asynchronous decoding subsystem processing signals of a third frequency; wherein the asynchronous acquisition subsystem, the asynchronous tracking subsystem, the asynchronous downsampling component and the asynchronous decoding subsystem operate at a natural frequency for each without clocking.

In other embodiments, the asynchronous global positioning system (GPS) channel baseband processor of these teachings includes a number of channel units, each channel unit having an asynchronous acquisition subsystem configured to obtain code offset and Doppler frequency estimates, the asynchronous acquisition subsystem receiving input from an RF front end and processing signals of a first frequency, an asynchronous downsampling component receiving an output from an asynchronous tracking subsystem and configured for downsampling the output of the asynchronous tracking subsystem down to the navigation data sampling rate and an asynchronous decoding subsystem receiving output from the asynchronous downsampling component and providing GPS satellite time and code start time information; said asynchronous decoding subsystem processing signals of a third frequency; wherein said asynchronous acquisition subsystem, said asynchronous tracking subsystem, said asynchronous downsampling component and said asynchronous decoding subsystem operate at a natural frequency for each without clocking. In those other embodiments, the system also includes one or more one arbitrated multiplexers receiving data for code offset and Doppler frequency estimates for each of the number of channels, an asynchronous tracking subsystem configured to track the code offset and Doppler frequency, the asynchronous tracking subsystem receiving data for code offset and Doppler frequency estimates for one channel from said at least one arbitrated multiplexer and processing signals of a second frequency, and one or more demultiplexers receiving the output from the asynchronous tracking subsystem and distributing the output to one channel.

In one instance, in those other embodiments, the system also includes at least another arbitrated multiplexer receiving prompt in phase and quadrature accumulations from the accumulators from each of the number of channels, a magnitude determinator providing a correlation power estimate for one channel in the number of channels, the code offset and Doppler frequency estimates being acquired when the correlation power estimate is greater than a predetermined threshold, and at least another arbitrated demultiplexer receiving an output from the magnitude determinator and distributing the output from the magnitude determinator to one channel.

In another instance, in those other embodiments, the system also includes at least yet another arbitrated multiplexer receiving, when the DLL component updates, a number of samples in a time lapsed during DLL updating, and code offset and Doppler frequency estimates from each of the number of channels, a code phase accumulator, the code phase accumulator providing a code start time for one channel in the number of channels, the code start time (CST) being incremented, from an initial code start time, when the DLL updates, by a number of samples in a time lapsed during DLL updating for said one channel, and at least yet another arbitrated demultiplexer receiving the code start time from the code phase accumulator and distributing the code start time to one channel.

In one or more embodiments, the method of these teachings for clockless GPS baseband processing includes:
a) receiving an input signal for one channel from an RF front and;
b) providing the input signal to a code numerically controlled oscillator (NCO) and a carrier NCO;
c) using overflows in the code NCO to mark a predetermined code period, thereby forming an accumulation interval and referencing time to sampling in the input signal;

d) obtaining, from output of the carrier NCO and the code NCO, early, prompt and late phase and quadrature accumulations;
e) obtaining code offset and Doppler frequency estimates for the one channel;
f) tracking deviations in code offset and Doppler frequency for the one channel, using the early, prompt and late phase and quadrature accumulations,
g) obtaining GPS satellite time and code start time from code offset and Doppler frequency information and the input signal; and
h) repeating steps (a)-(g) until all channels have been processed; wherein all steps are performed asynchronously.

Details of embodiments of the system of these teachings are presented here in below beginning with a system overview. The embodiments presented below should be considered exemplary embodiments, which do not limit the scope of these teachings. It should be noted that all numbers expressing quantities, conditions, and so forth used in the exemplary embodiments, are not limitations of these teachings, other detailed embodiments being within the scope of these teachings.

The dataflow-driven system of these teachings expects 1-bit samples from an RF front end which it uses to acquire, track, and extract crucial data. It then sends the extracted data to a co-processor or base station for navigation solution computation. In order to solve the four unknowns corresponding to the receiver time, X, Y and Z coordinates, a GPS receiver needs to track at least four satellites. To allow for redundancy and the flexibility to compute an over-determined least-squares solution, in one instance, the system of these teachings is capable of tracking up to six satellites simultaneously. This is accomplished, in one instance, with six GPS channels, where each channel is responsible for processing the signal from one particular satellite. The system of these teachings is optimized to have all channels share, in one embodiment, a single tracking loop. Systems that share more than one tracking loop are also within the scope of these teachings.

A comprehensive description of conventional GPS baseband processor architectures is readily available. Hereinbelow, an embodiment of a GPS baseband processor of these teachings is described.

Figure 2:
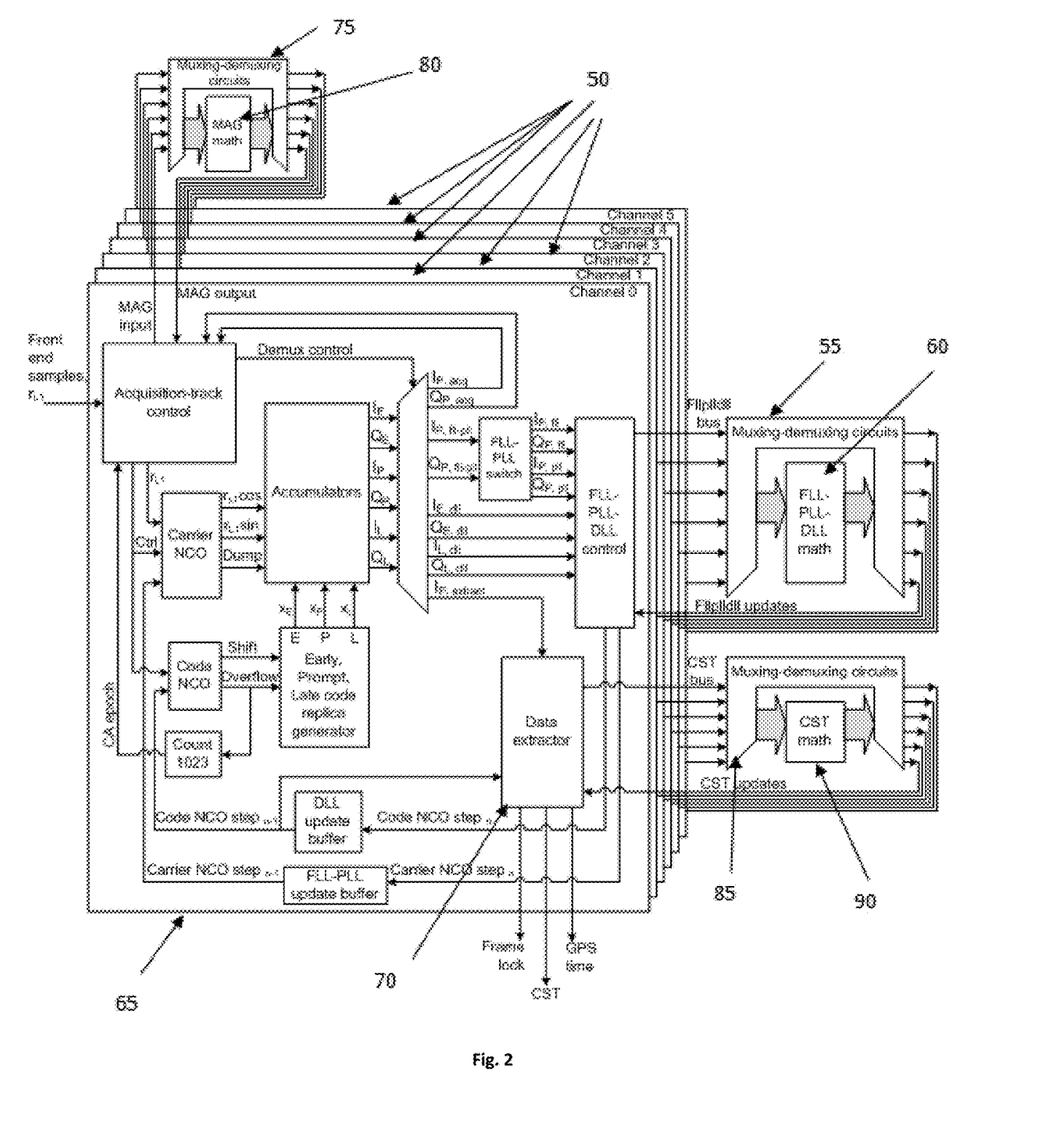
FIG. 2 is a schematic block diagram representation of an embodiment of the system of these teachings.

FIG. 2 shows a detailed schematic block diagram representation of an embodiment of the system of these teachings.

Figure 2A:
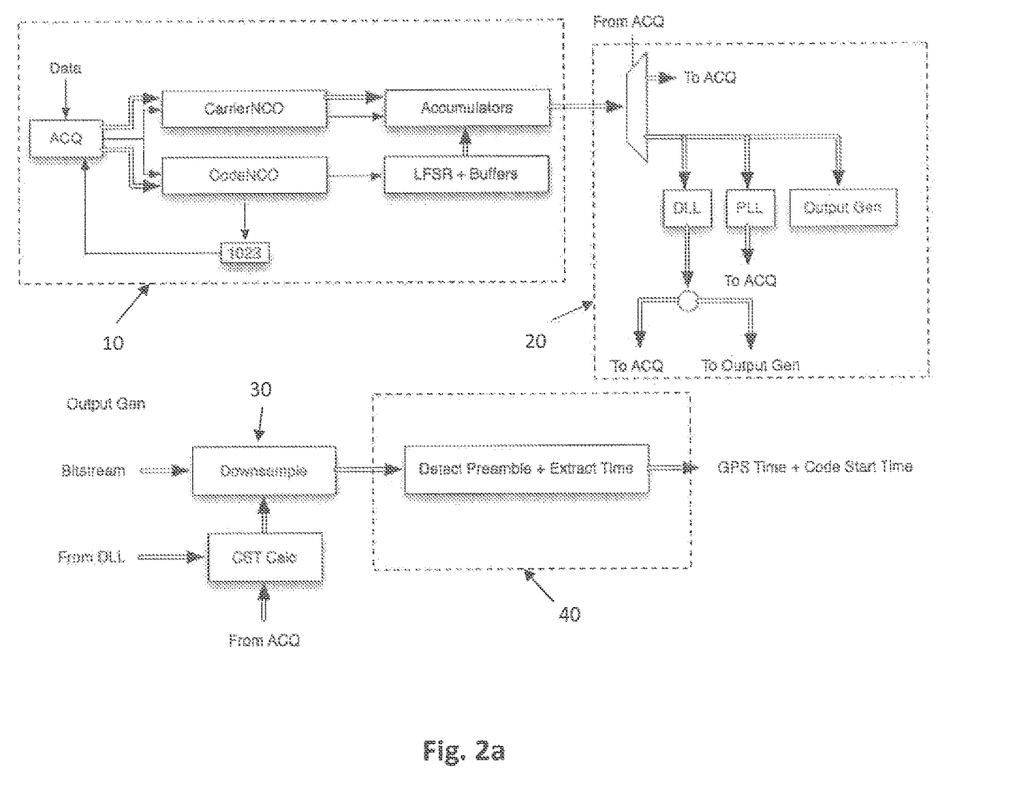
FIG. 2a is a schematic block diagram representation of another embodiment of the system of these teachings.

FIG. 2a shows a high level schematic block diagram representation of an embodiment of the system of these teachings. Referring to FIG. 2a, in the embodiment shown therein, the asynchronous global positioning system (GPS) channel baseband processor includes an asynchronous acquisition subsystem 10 configured to obtain code offset and Doppler frequency estimates and receiving input from an RF front end, an asynchronous tracking subsystem 20 configured to track deviations in the code offset and Doppler frequency, the asynchronous tracking subsystem receiving data for code offset and Doppler frequency estimates, an asynchronous downsampling component 30 receiving an output from the asynchronous tracking subsystem and configured for downsampling the output of the asynchronous tracking subsystem down to a navigation data sampling rate, and an asynchronous decoding subsystem 40 receiving output from the asynchronous downsampling component and providing GPS satellite time and code start time information, wherein the asynchronous acquisition subsystem, the asynchronous tracking subsystem, the asynchronous downsampling component and the asynchronous decoding subsystem operate at a natural frequency for each without clocking. In one instance, these teachings not being limited to only that instance, the acquisition subsystem processes signals at a few megahertz, the tracking subsystem and the downsampling component process signals at about 1 kHz and the decoding subsystem processes signals at about 50 Hz.

FIG. 2 shows a block diagram representation of an embodiment of the system of these teachings in which there are six (6) channel units 50, each channel unit having an asynchronous acquisition subsystem (10, FIG. 2a), an asynchronous downsampling component (30, FIG. 2a), and an asynchronous decoding subsystem (40, FIG. 2a; the asynchronous downsampling component and the asynchronous decoding subsystem being contained in the data extractor 70), all in one unit 65 per channel. The units 65 share through first muxing/Demuxing circuits 55 an asynchronous tracking subsystem 60, through second muxing/Demuxing circuits 75 an asynchronous magnitude determinator 80, and through third muxing/Demuxing circuits 85 an asynchronous code phase accumulator 90.

Acquisition

Before a receiver can begin to track a satellite, it needs to know which satellite to track, and an estimate of the Doppler frequency and code offset of the signal for that particular satellite. Therefore, during signal acquisition, a typical receiver searches the expected Doppler frequency space and code offset space of candidate satellites.

First, for each candidate satellite, the input signal from the RF front end undergoes a carrier-wipeoff with a candidate Doppler frequency $\hat{f}_D$ (further downconversion to baseband) and a code-wipeoff using a locally-generated code replica, $X_P$, with a candidate code offset, $\hat{\tau}$ (code stripping process). This $(\hat{f}_D, X_P, \hat{\tau})$ candidate hypothesis is tested by correlating the anticipated signal with the received signal over a 1 ms code period (N front end samples) to yield an in-phase accumulation, I and the quadrature accumulation, Q. Denoting the $k^{th}$ sample from the RF front end by $r_{L1}(t_k)$, and the intermediate frequency to which the satellite signal has been mixed down by the RF front end by $f_{IF}$, the following is obtained:

$$I = \sum_{k=1}^{N} r_{L1}(t_k) X_P(t_k - \hat{\tau}) \cos\{2\pi(f_{IF} + \hat{f}_D)t_k\} \quad (2)$$

$$Q = \sum_{k=1}^{N} r_{L1}(t_k) X_P(t_k - \hat{\tau}) \sin\{2\pi(f_{IF} + \hat{f}_D)t_k\} \quad (3)$$

If the correlation power, $I^2+Q^2$, exceeds a threshold, then the $(\hat{f}_D, X_P, \hat{\tau})$ hypothesis is validated and acquisition for one satellite has been completed.

In one instance, the system of these teachings implements an assisted acquisition approach where the system is provided with the satellite number to acquire as well as their respective correlation power threshold and slowly-varying Doppler frequency estimate $\hat{f}_D$. This is further described herein below.

In each channel shown in FIG. 2, two 32-bit numerically controlled oscillators (NCO) are driven by the data-flow from the front end. The code NCO controls the chipping rate of the code replica generator. Every time the code NCO overflows, a new code replica is generated and every $1023^{rd}$ overflow of the code NCO marks the end of a 1 ms code period, forming our accumulation interval. The carrier NCO consumes data bit whenever one is available, and correlates this against replicated sinusoids to create a 3-bit output for both the in-phase and quadrature components. Together, these signals form the correlator summands from Equations (2) and (3).

Tracking

After acquisition, the receiver channel has enough knowledge of the code offset and Doppler frequency to roughly align its code and carrier replicas to the received signal. The receiver channel then enters tracking mode to continuously track deviations in code offset and Doppler frequency.

Besides the prompt correlators that produce the prompt in-phase accumulation in (2) and quadrature accumulation in (3), each channel uses early correlators with the replica PRN code advanced by a ½ chip to produce the early in-phase and quadrature accumulations, and likewise, late correlators with the replica PRN code delayed by a ½ chip to produce the late in-phase and quadrature accumulations. These early and late accumulations are needed to implement a DLL which is used to update the chipping rate for the channel's code NCO to correct for misalignments in phase between the replica PRN code and the received PRN code.

Other than tracking the code phase, the system uses an FLL and a PLL to track the Doppler frequency. The FLL is more robust to noise, has better dynamic performance, and has a wider pull-in range than the PLL but its measurements are noisier. Hence, the FLL is only used to obtain a more accurate estimate of the Doppler frequency immediately after acquisition before handing the task over to the PLL.

The transition from FLL tracking to PLL tracking happens after a programmable delay (400 ms was used in one instance). The PLL locks the phase of the in-phase portion of the carrier replica to the incoming signal. The DLL, FLL and PLL tracking loops are only called into action at the end of an accumulation period which occurs once every 1 ms in each channel. More details on the tracking loops of these teachings can be found hereinbelow.

Embodiments of the DLL, FLL and PLL components are disclosed below. It should be noted other embodiments are within the scope of these teachings. The asynchronous DLL, FLL and PLL components disclosed below implement the DLL, FLL and PLL by implementing the evaluation of the expression for the output of the DLL, FLL and PLL.

In one embodiment, the system of these teachings implements a non-coherent normalized Early-Minus-Late (EML) DLL discriminator which gives a delay error estimate, in units of chips, at the end of the $n^{th}$ accumulation period, in the form $$\tau_{err,n+1} = \frac{1}{2}\left(\frac{\sqrt{I_{E,n}^2 + Q_{E,n}^2} - \sqrt{I_{L,n}^2 + Q_{L,n}^2}}{\sqrt{I_{E,n}^2 + Q_{E,n}^2} + \sqrt{I_{L,n}^2 + Q_{L,n}^2}}\right) \quad (4)$$

where $I_{E,n}$ and $Q_{E,n}$ are the early in-phase and quadrature accumulations whereas $I_{L,n}$ and $Q_{L,n}$ are the late in-phase and quadrature accumulations. Using feedback control theory with a first order loop filter and scaled loop gain of H that also controls the DLL bandwidth, and incorporating carrier aiding to minimize noise, the channel produces an updated chipping rate estimate $\hat{f}_{chip,n+2}$ for the code NCO to apply as its step size to realign the replica PRN code's phase to the received PRN code phase.

$$\hat{f}_{chip,n+2} = 1.023 \times 10^6 \left(1 + H\tau_{err,n+1} + \frac{\hat{f}_{D,n+2}}{f_{L1}}\right) \quad (5)$$

Note that the chipping rate update is not applied in the $(n+1)^{th}$ accumulation period but in the $(n+2)^{th}$ for reasons that are discussed hereinbelow. The DLL is tuned accordingly to accommodate this optimization.

In one instance, the system of these teachings implements a four-quadrant arctangent FLL discriminator, $\delta\theta$ with the objective of minimizing the Doppler frequency estimate error which is directly proportional to the rate of rotation of the prompt in-phase and quadrature accumulations' phasor. The rotation angle of the phasor that occurs in one code period at the end of the $n^{th}$ accumulation period is computed as $$\delta\theta_{n+1} = s_m \tan^{-1}\left(\frac{Q_{P,n}I_{P,n-1} - I_{P,n}Q_{P,n-1}}{I_{P,n}I_{P,n-1} + Q_{P,n}Q_{P,n-1}}\right) \quad (6)$$

where $I_{P,n}$ and $Q_{P,n}$ are the prompt in-phase and quadrature accumulations for the $n^{th}$ code period and $I_{P,n+1}$ and $Q_{P,n-1}$ are the prompt in-phase and quadrature accumulations for the $(n-1)^{th}$ code period. The variable $s_m$ is the mixing sign where $s_m=1$ corresponds to a low-side mixing scheme in the RF front end and $s_m=-1$ high-side. This discriminator is not affected by the sign flip in the prompt in-phase and quadrature accumulations caused by data bit transitions in the signal. The FLL uses a second order filter loop.

As for the PLL, in one instance, the system of these teachings implements a two-quadrant arctangent Costas Loop discriminator, $\varphi_D$. The PLL maximizes the in-phase correlation power while minimizing the quadrature correlation power, which is equivalent to minimizing the phasor angle, $\varphi_{D,n+1}$ of the quadrature accumulation vector from the in-phase accumulation vector at the end of the $n^{th}$ accumulation period. The PLL uses a second order loop filter. In one embodiment, the phasor angle, $\varphi_{D,n+1}$ of the quadrature accumulation vector from the in-phase accumulation vector at the end of the $n^{th}$ accumulation period is given by $$\phi_{D,n+1} = s_m \tan^{-1}\left(\frac{Q_{P,n}}{I_{P,n}}\right) \quad (7)$$

Data Extraction

The GPS satellite's signal contains a 50 bps navigation data stream. This data stream is modulated with the satellite's PRN code which has a period of 1 ms. As a result, 20 periods of the satellite's PRN code contain information for the same data bit. Since a PLL is used for tracking, the accumulation power is concentrated in the in-phase accumulation. Hence, at the end of a 1 ms accumulation period, we one raw data bit is extracted from just the sign of the prompt in-phase accumulation.

To remove the redundant data bits, in one instance, the raw data bits is down-sampled by 20 to 1. From the down-sampled data, the system attempts to lock onto the GPS message frame. Each 300-bit subframe begins with the preamble sequence of "10001011", so the system initially simply searches for this pattern.

However, as, in one instance, the PLL discriminator has a 180-degree phase ambiguity, the extracted data bits may be inverted. Thus, a search for both the normal and inverted preamble bit sequence is required. To ensure that the detected bit sequence is indeed the preamble bits instead of a string of navigation data message bits that happens to match the preamble bit sequence, the system extracts the GPS satellite time information and checks that it correctly increments from one subframe to the next before announcing frame lock.

In one instance, the system of these teachings uses a code phase accumulator for each channel, hereafter called Code Start Times (CST), as time stamps in units of sample counts to mark the start of the C/A PRN code period. Every time the DLL updates (approximately 1 ms), the CST is incremented by the number of samples in that approximate 1 ms time lapse. At an interval of 1 s, determined by counting 1000 raw data bits from the start of a subframe, each channel reports its frame lock status, GPS satellite time and its corresponding 64-bit CST time stamp.

With these three pieces of information from at least four satellites, an external co-processor or a base station can compute the navigation solution. First, relative pseudoranges are computed from the CST values of each channel using the first channel as the reference. From the relative pseudoranges and corresponding GPS times, the X, Y and Z receiver position and receiver clock error can then be computed.

Note that, in one instance, a typical pseudorange measurement rate is 1 Hz but by reducing the size of the raw data bits counter, the system can be made able to support higher pseudorange measurement rate for high-dynamics applications. This is possible as the CST time stamps are readily available at the end of every accumulation interval.

Natural Frequency Operation of all Sub-Systems

The structure of the GPS signal allows for signal processing at different rates. By designing the system with asynchronous circuit techniques, each sub-system—fast and slow—can be enabled to run at its natural frequency.

Tokens are passed down through handshakes from fast sub-systems to slower sub-systems to enable on-the-fly signal processing without the use of memory. The correlators comprising accumulate and dump modules, code and carrier NCOs and their controls operate at the RF front end sampling frequency of several MHz. This is the fastest rate the system is expected to handle. The next signal processing step involving the tracking loops is three orders of magnitude slower as each channel's correlators only dump their accumulations at the end of a 1 ms accumulation period.

Furthermore, only 1 in every 20 raw data bits extracted from the sign of the 1 KHz stream of prompt in-phase accumulations is used for navigation message extraction. From this 50 bps data stream, the system derives frame lock and satellite time information and finally outputs CST measurements at 1 Hz. Rather than using the complicated fixed-point arithmetic circuits implemented with bundled data techniques, all modules in the system are implement using QDI techniques.

In one embodiment, the system of these teachings uses overflows in the code NCO to mark a predetermined code period, thereby forming an accumulation interval and referencing time to sampling in the input signal. As each of the subsystems operates at a natural frequency for the subsystem without clocking, frequency ratios, necessary for GPS operation, are preserved.

Adder and Increment-Decrement Accumulators

Accumulators operate at the RF front end sampling frequency and are one of the more power-hungry components in the whole system. Moreover, there are six accumulators per channel to produce early, prompt and late pairs of in-phase and quadrature accumulations.

The 3-bit accumulator inputs which are represented by the summands in (2) or (3) and their early and late variants, are accumulated over one accumulation period to produce 16-bit sum outputs. It follows from (2) and (3) that when the system is tracking well, the iterative cross-correlation of the replica and received signals will either trend towards $+\infty$ or $-\infty$, depending on the sign of the encoded navigation data bit.

As the 3-bit summand is iteratively added to the 16-bit sum, the bits of higher significance do not switch frequently. Based on these observations, an increment-decrement-based accumulator design is used to reduce transistor switching activity and hence the dynamic power consumption of this critical module.

In one instance, instead of using a standard 16-bit accumulator consisting of an adder with its output fed back to one of its inputs via a register, a standard 3-bit accumulator coupled with an increment-decrement-dump unit (IDD) was implemented. Only a minimal number of low order bits (three because of the 3-bit input) are required to cycle in an out of the adder in the standard 3-bit accumulator. The rest of the higher order bits are handled by the IDD.

Figure 3:
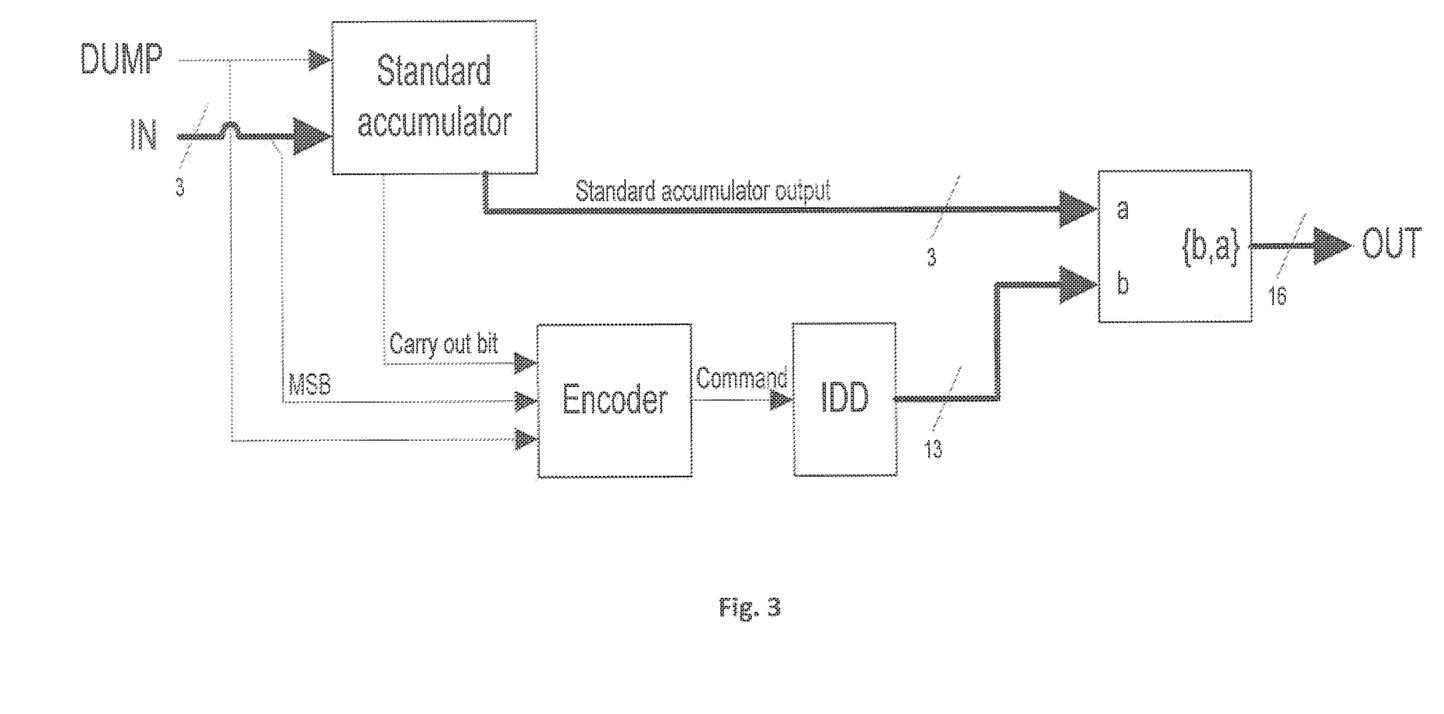
FIG. 3 is a schematic block diagram representation of one component of an embodiment of the system of these teachings.

Referring to FIG. 3, an encoder issues the command to increment or decrement based on the polarity of the input summand and the carry out from the adder. If the input to the accumulator is positive, the encoder issues an increment command if there is a carry out from the standard accumulator. Note that the negative of a 2's complement number a (a>0) represented with n bits is written as: $-a=2^n-a$ where a "borrow" is obtained from the virtual $(n+1)^{th}$ bit. Therefore, if the input to the accumulator is negative, the encoder issues a decrement command if there is no carry out from the standard accumulator as it would otherwise cancel out the "borrow" loaned from the higher order bits in the IDD. If neither of these cases hold, the encoder issues no command and triggers no transistor switching activity at all in the entire IDD.

In one embodiment, the 13-bit IDD was designed with 13 cells, each of which implements a need-based command propagation structure. If the IDD receives a command to increment, the LSB cell will increment its own value and will only propagate the increment command to the next higher-order cell if the LSB cell has a carry out; otherwise the higher-order cells experience no switching activity at all. Other than the MSB cell which does not need to propagate any commands further, all higher-order cells have the same need-based command propagation behavior as the LSB cell. Likewise, each IDD cell only propagates the decrement command if it needs to "borrow". The dump command, which the accumulator receives once every 1 ms, is propagated throughout the IDD from the LSB to the MSB cell. The full accumulation result is just a concatenation of the result from the standard 3-bit accumulator and the result from the 13-bit IDD.

Memoryless Code Phase Acquisition

Acquisition is typically done either using frequency domain search techniques with an FFT engine or using time domain search techniques with a bank of parallel correlators. For the assisted system of these teachings that is provided with a PRN number of a satellite, a rough Doppler frequency estimate, and acquisition power threshold at start up, each channel proceeds to search the code offset space on-the-fly without the use of memory. This design exploits the fact that the PRN code sequence in the signal is periodic with a period of 1 ms, and that the Doppler frequency is relatively stable over short time periods.

Each channel scans the in-coming front end samples for the correct code offset by performing 1 ms-long accumulations and dropping one front end sample and incrementing an offset counter by 1 at the end of each accumulation period. When the acquisition power, given by equations (2) and (3), him and exceeds the threshold, that channel has found the correct code offset, $\hat{\tau}_{0,m}$, where m is the channel number. The value of $\hat{\tau}_{0,m}$ is indicated by the value in the offset counter.

As different satellite signals have different code offsets, different channels will finish acquisition at different times. To handle this problem, in one instance, the channels re-synchronize at strategic reference points determined by their respective code offsets, acquisition time lapses and Doppler frequency estimates. Specifically, each channel ignores front end samples until the sample count equals the code start index $CST_{0,m}$ shown in Equation (9). Upon doing so, the channel initializes its CST value as $CST_{0,m}$ resets its NCOs and begins tracking.

The time needed for the $m^{th}$ channel to acquire, rounded to the next second, is simply:

$$t_m = \left\lceil \frac{\hat{\tau}_{0,m}}{1000} \right\rceil \quad (8)$$

$CST_{0,m}$ is calculated by adding $\hat{\tau}_{0,m}$ with the Doppler-adjusted number of samples over $t_m$ seconds as follows:

$$CST_{0,m} = N_0\left(1 + s_m \frac{f_{D,m}}{f_{L1}}\right)t_m + \hat{\tau}_{0,m} \quad (9)$$

where $N_0$ is the nominal number of front end samples per second; $s_m$ is the front end mixing sign where $s_m=1$ corresponds to a low-side mixing scheme in the RF front end and $s_m=-1$ high-side; $f_{D,m}$ is the rough Doppler frequency estimate for the $m^{th}$ channel and $f_{L1}$ is the L1 carrier frequency.

The asymmetric acquisition design of these teachings precludes the need for a bank of correlators dedicated to acquisition. The same code and carrier NCO's and accumulators are used both in acquisition mode and tracking mode. As shown in FIG. 2, a demultiplexer in each channel routes the outputs of the accumulators either to the acquisition threshold detector in acquisition mode or to the tracking loops and data extractor in tracking mode.

Bundled Data Math

Each channel needs to be able to carry out the math functions involved in the FLL, PLL and DLL tracking loops and in CST computation. To acquire the requisite levels of accuracy, these arithmetic circuits involved have wide datapaths. Although these arithmetic functions are highly complicated, each channel only performs such computations once every 1 ms. Based on these observations, and to save design time, these computational functions were implemented in single-rail combinational logic blocks using fixed-point arithmetic, and do so in such a way that they are synthesizable by commercial tools. All of the channels share these blocks using arbitrated muxing and de-muxing circuits. Data is communicated back and forth between the asynchronous QDI modules and the combinational logic blocks using a hybrid dualrail-bundled data interface.

Figure 4:
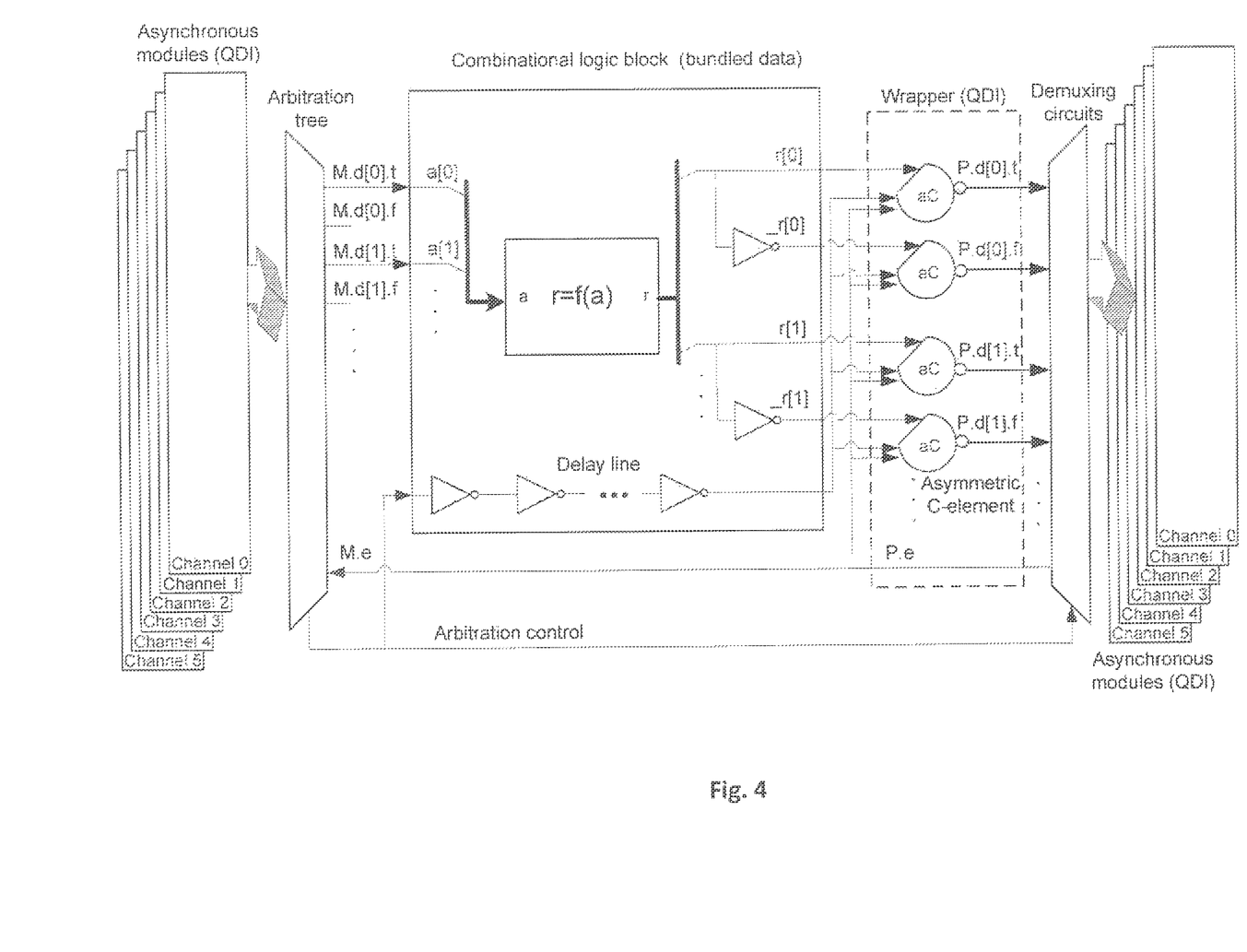
FIG. 4 is a schematic block diagram representation of another component of an embodiment of the system of these teachings.

FIG. 4 illustrates how six receiver channels share a single combinational logic math block. Through arbitration, the muxing circuit sends data from the asynchronous QDI domain through its dualrail channel M into the combinational logic math block. The true rails of channel M drive the single-rail inputs of the combinational logic block.

The arbitration control signal derived from the validity of M drives a matched delay line larger than the computation delay of the combinational logic block. Using asymmetric C-elements, the normal and inverted forms of the outputs from the combinational logic block are gated with the output of the delay line and the acknowledge of the output dualrail channel P to generate the requisite true and false rails. Once the signal is back in the asynchronous QDI domain, the data is distributed to the corresponding receiver channel through de-muxing circuits.

Optimized Tracking Loops

At the end of a 1 ms accumulation period, a channel dumps its accumulations and uses the shared FLL, PLL and DLL tracking loops to update its code and carrier NCOs step sizes. Due to the complexity of the math involved, the tracking loops cannot have high levels of throughput as simple combinational blocks. The slowness of the tracking loop affects the entire asynchronous system because the NCOs will not obtain their step size updates fast enough to process the next data sample received from the RF front end.

To meet the system throughput requirements, the channel defers the application of the tracking loops outputs to the next accumulation period. At the end of the $n^{th}$ accumulation period, the NCOs update their step sizes immediately with the tracking loops outputs computed from the $(n-1)^{th}$ accumulation period. By doing so, we not only can afford to implement slower and more power efficient tracking loops, but also can afford to allow all channels to share the same tracking loops. The tracking loops parameters are analyzed and tuned accordingly.

Some software GPS systems use floating point math to get the accuracy required for their tracking loops. However, since floating point arithmetic circuits would consume more power and increase circuit complexity, all computational circuits in the bundled-data blocks were implemented with fixed point arithmetic.

Figure 5:
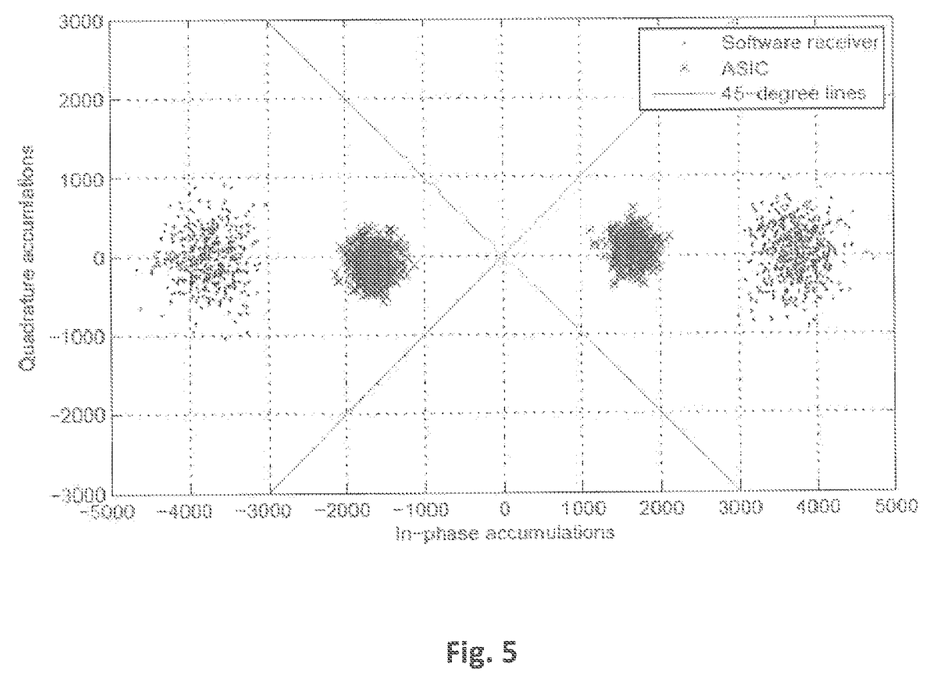
FIG. 5 shows In-phase and quadrature accumulations phasor compared to software receiver's.

As shown in Equation (4), the DLL implements a discriminator with computationally expensive vector magnitude functions, involving both square and square-root operations. To reduce the complexity of the this operation, a modified version of the Robertson approximation was applied where $$A=\sqrt{I^2+Q^2}\approx \max(|I|+\tfrac{1}{4}|Q|, |Q|+\tfrac{1}{4}|I|) \quad (10)$$

Though the largest approximation error is about 10% at a phasor angle of 45 degrees, the typical approximation error is less than 3% because the system's PLL drives the phasor angle to zero, as shown in FIG. 5.

Additionally, the arctangent functions shown in Equations (5) and (6) can be simplified with a Taylor series small angle approximation where: $\tan^{-1}(\theta)\approx\theta$. This arctangent approximation is valid for the present embodiment because the FLL and PLL discriminator values are small and the carrier phase errors alone only correspond to centimeter level errors in the navigation solution.

For the sake of modularity, the system's programmable hardware tracking loops allow them to be tailored to different tuning parameters and RF front end frequency plans.

Therefore, the tracking loops parameters must be initialized from an external source on power-on.

Simulation Results

Receiver Performance Simulations

In one instance, the GPS system of these teachings was described in the CHP language, a variant of CSP that is widely used when describing QDI asynchronous circuits. Details of the CHP description are provided in U.S. Provisional Application Ser. No. 61/602,145, entitled A LOW POWER ASYNCHRONOUS GPS BASEBAND PROCESSOR, which is incorporated by reference herein in its entirety and for all purposes. The CHP simulation was verified against a GPS software receiver written in MATLAB. Through the process of Martin synthesis, this high-level CHP description was translated into a gate-level description of the system of our teachings.

The correctness of the gate-level implementation is verified with a co-simulation involving Synopsys VCS and an in-house asynchronous circuit simulator. The detailed simulation results—sequences of values transmitted on all communication channels in the system—from the gate-level co-simulation were found to match that of the CHP simulation.

The system of these teachings was simulated with 60 seconds of satellite signals generated from the Spirent GPS simulator without atmospheric, ionospheric or multipath errors. The signal from the Spirent GPS simulator is fed into the Zarlink GP2015 front end providing digital samples with a sampling period of 175 ns. These datapoints are recorded in a binary file that is subsequently fed into the CHP and gate-level simulations of the system of these teachings. The receiver position is computed from 6 satellites and compared to the actual simulated position.

Figure 6:
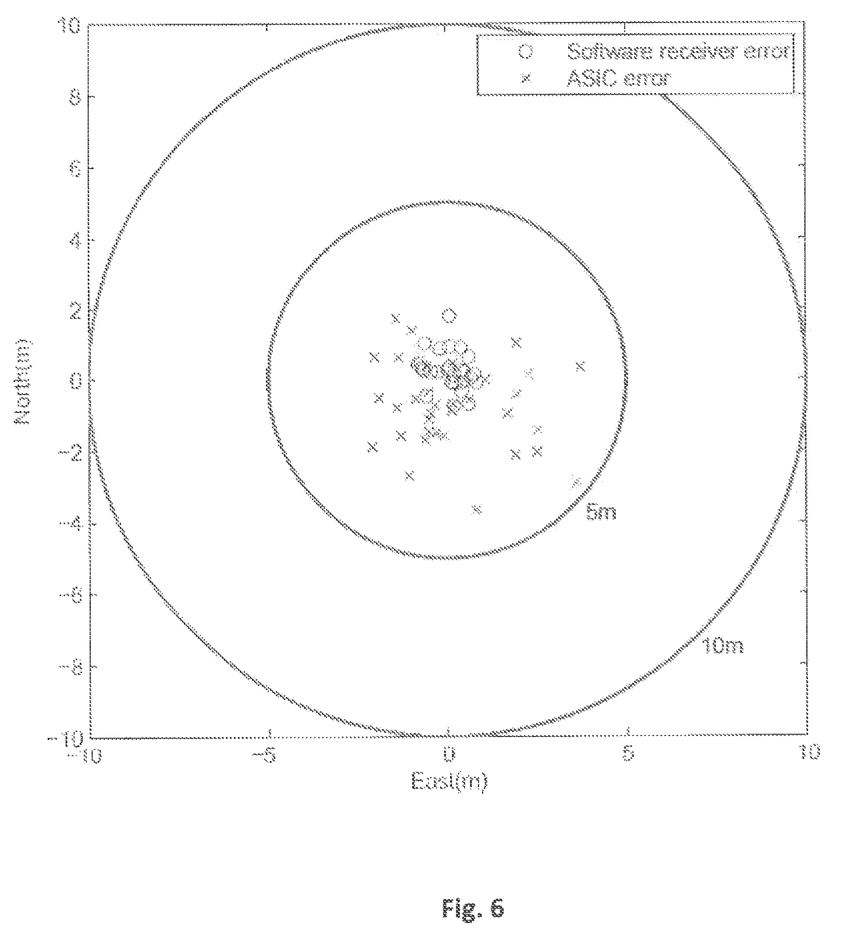
FIG. 6 shows GPS Position accuracy using 6 satellites.

A comparison of position error between the system of these teachings and a reference Matlab software receiver developed by a leading GPS research group is shown in FIG. 6. The system of these teachings has a larger error spread because of the use of a single-bit RF front end samples, longer acquisition, fixed point arithmetic and the arithmetic approximations.

Figure 7A:
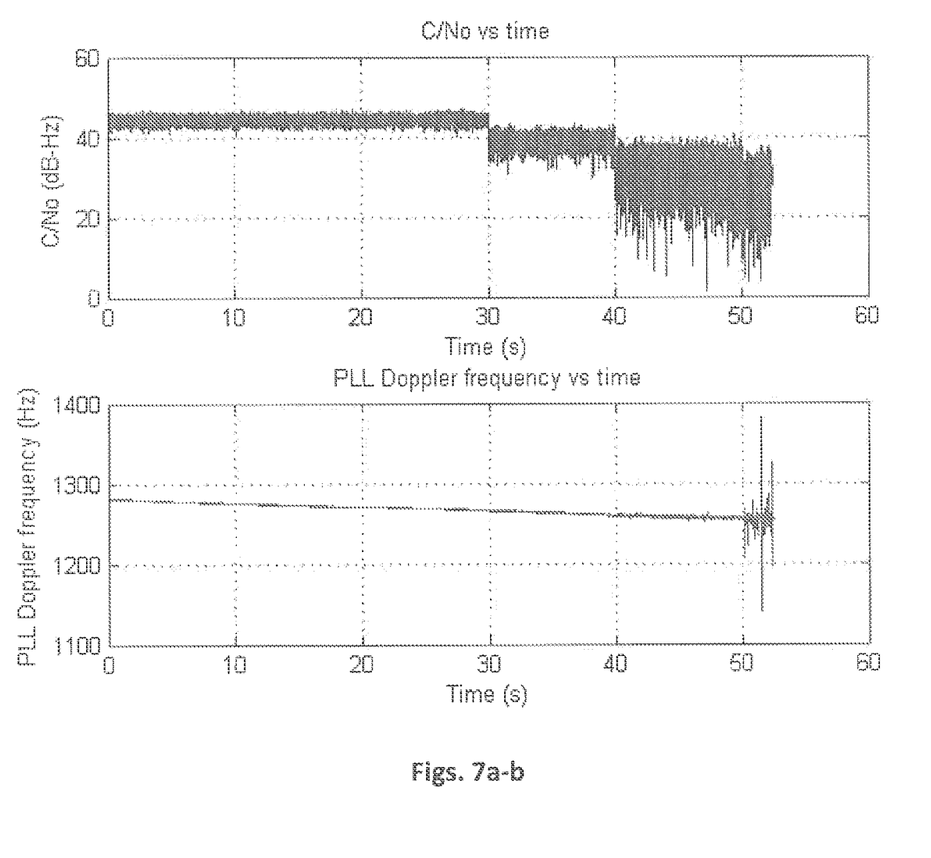

Tracking sensitivity was tested with the Spirent GPS simulator using a graded reduction in carrier to noise ratio (C/No) every 10 seconds starting from the $30^{th}$ second. FIGS. 7a-7b show that for C/No above 35 dB-Hz, the PLL experiences no loss of lock. Hence, the PLL of these teachings performs well in normal conditions but in weak-signal environment, longer accumulation intervals would be needed to boost tracking sensitivity. If the accumulation interval were to be increased, the width of the accumulators, and the design of the bundled-data math would need to changed. As widening the accumulators corresponds to adding additional bits to the IDD unit, this will only marginally increase switching power. Additionally, as the frequency of the bundled-data arithmetic circuits is low, the width of the accumulators can be increased with only minimal cost to power.

Figure 8:
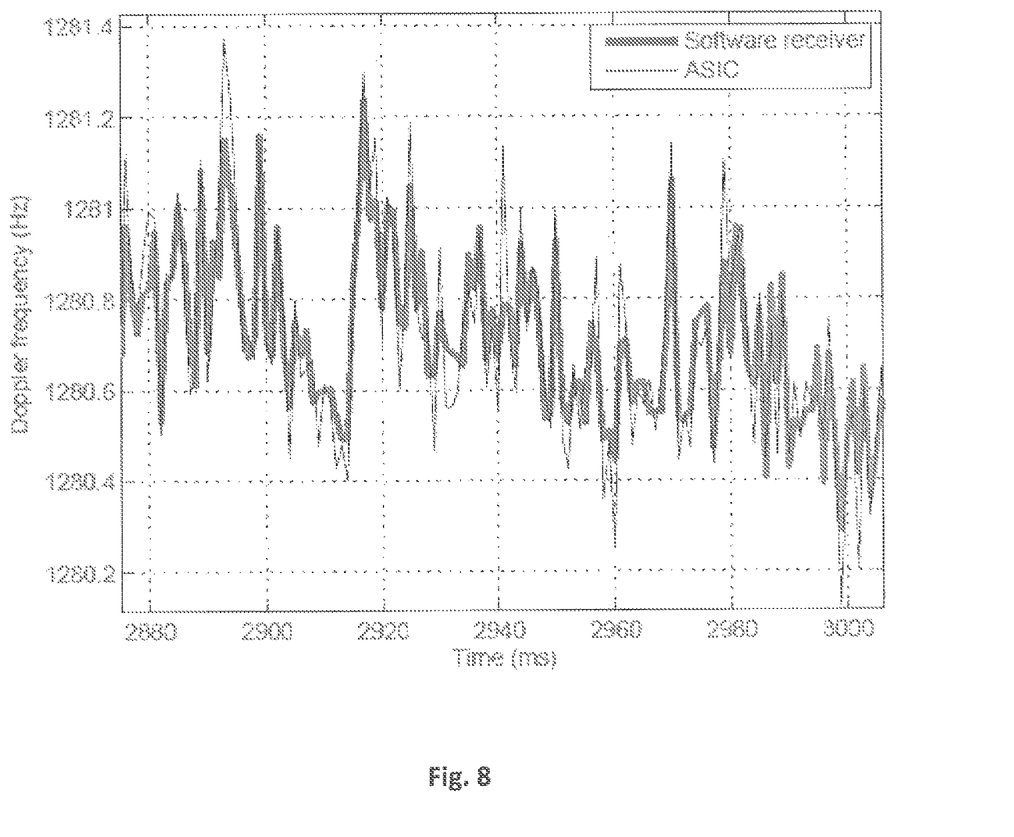
FIG. 8 shows results for tracking of Doppler frequency by the PLL compared to software receivers.

The front end's ADC quantization noise also plays a part in tracking sensitivity. FIG. 5 shows the in-phase and quadrature accumulations distribution when tracking with the PLL of these teachings where the correlation power is concentrated in the in-phase portion of the signal and the data bit flips in the signal contribute to the 2 blobs on each side of the vertical axis. The Matlab software receiver which uses 2-bit ADC samples has a higher correlation power than ours which uses only 1 bit. Despite using fixed-point arithmetic and approximations, the PLL of these teachings tracks Doppler frequency relatively well, albeit noisier compared to the Matlab software receiver as shown in FIG. 8.

Power Simulations

HSIM simulations on the system of these teachings were performed in a 90 nm (Vdd=1V and T=25° C.) technology. To account for wire capacitance, a wire load was added in the simulations to provide a more realistic account of our power numbers. The added wire capacitance is based on estimates from post-layout simulations of a portion of the system of these teachings. Table I shows the power consumption of various modules in the system for 1 and all 6 receiver channels in acquisition and continuous tracking modes.

Note that since the acquisition and tracking modes in the architecture of these teachings share almost all of the fast-rate modules that make up the correlators, the power consumption in both modes are close to each other. Since the implementation of a 6 receiver channel system involves duplicating the channel-dependent modules in a single channel six times, the power consumption of the full 6-channel system can be derived by adding the power consumption of the multiplexed shared math modules with 6 times the power consumption of the channel-dependent modules in a single channel. The total power consumed by the 6-channel system of these teachings is 1.5 mW during acquisition and 1.4 mW in continuous PLL tracking mode.

TABLE 1

Power breakdown by module for a single channel and six channels

|  | Acq (µW) 1 Chan) | Track (µW) (1 Chan) | Acq (µW) 1 Chan) | Track (µW) (6 Chan) |
| --- | --- | --- | --- | --- |
| Acq control | 12.8 | 10.1 | 77.0 | 61.0 |
| Code Generator | 6.96 | 6.66 | 41.8 | 39.9 |
| Carrier NCO | 79.6 | 73.8 | 477 | 443 |
| Code NCO | 73.2 | 66.7 | 439 | 400 |
| 6 Accumulators | 63.3 | 65.1 | 380 | 391 |
| Bundled-Data | 3.95 | 4.09 | 5.90 | 6.38 |
| Other | 14.1 | 17.2 | 81.6 | 102.8 |
| Total | 253 µW | 243 µW | 1.50 mW | 1.44 mW |

Table II provides a comparison of our system with other contemporary GPS receivers. [6], [14] and [15] are system on chip (SOC) GPS receivers with integrated RF front end and digital baseband processing ([6] is described in J.-M. Wei, et al., "A 110 nm rfcmos gps soc with 34 mw-165 dbm tracking sensitivity," in Solid-State Circuits Conference—Digest of Technical Papers, 2009, ISSCC 2009. IEEE International, February 2009, pp. 254-255, 255a, [14] is described in G. Gramegna, et al., "A 56-mw 23-mm2 single-chip 180-nm cmos gps receiver with 27.2-mw 4.1-mm2 radio," Solid-State Circuits, IEEE Journal of, vol. 41, no. 3, pp. 540-551, March 2006, and [15] is described in D. Sahu et al., "A 90 nm cmos single-chip gps receiver with 5 dbm out-of-band iip3 2.0 db nf," in Solid-State Circuits Conference, 2005, Digest of Technical Papers, ISSCC. 2005 IEEE International, February 2005, pp. 308-600 Vol. 1).

To compare the per channel baseband processing power of the system of these teachings with these SOCs, the power consumed by their RF front ends was subtracted from their system power, the result of which is then divided by the number of channels tracked. Note that these SOCs have the ability to compute position estimates whereas our system stops short of doing that but provides measurements that can be used to derive position estimates in a host processor or base station. Nevertheless, the power consumed in position estimate computation is negligible for typical position update rates on the order of 1 Hz.

Taking all these into consideration, the per channel baseband processing power is about 3 times lower than [6] and about 12 times lower than [14]. The position estimates for the system of these teachings, computed offline, have a 3D-RMS error below 4 m which is comparable to [14]. The higher number of satellites tracked by [14] however does improve its position accuracy due to the effects of Dilution of Precision (DOP).

TABLE 2

Comparison with state-of-the-art

| Name | This Work | [6] | [14] | [15] |
|---|---|---|---|---|
| Precess (nm) | 90 | 110 | 180 | 90 |
| Voltage (V) | 1.0 | 1.2 | 1.6 | 1.4 |
| Number of Channels | 6 | 22 | 12 | — |
| System Power (mW) | 1.4 | 34 | 56 | 84 |
| RF Power (mW) | — | 19.5 | 20 | — |
| Baseband Power (mW) | 1.4 | 14.5 | 36 | — |
| Baseband Power/Channel (mW) | 0.2 | 0.7 | 3 | — |
| 3-D rms Error (m) | 3.9 | — | 3 | — |

Embodiments of the design and implementation of an asynchronous low power GPS baseband processor have been presented. The system of these teachings implements an assisted acquisition scheme with sequential code phase search, a continuous tracking mode optimized for low power consumption and a data extraction scheme to provide synchronized Code Start Time measurements. The system of these teachings achieves low power by allowing each subsystem to operate at its natural frequency, by reducing switching activity in the accumulators with an increment-decrement based design and by employing shared tracking loops with deferred updates, fixed-point arithmetic and mathematical approximations. The embodiment of the system of these teachings consumes 1.4 mW during continuous tracking mode with position 3-D rms error below 4 meters.

The system of these teachings can be integrated with a low-power RF front end, and a microcontroller for initial acquisition and later data extraction. Additionally, the above described embodiments presented can be extended to increase potential position accuracy and tracking sensitivity in weak-signal environments without significantly increasing the power consumption.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

While the foregoing includes the best mode and, where appropriate, other modes of performing the disclosure, the disclosure should not be limited to specific apparatus configurations or method steps disclosed in this description of the preferred embodiment. Those skilled in the art will also recognize that the disclosure has a broad range of applications, and that the embodiments admit of a wide range of modifications without departing from the claimed inventive concepts.

What is claimed is:

1. A method for clockless GPS baseband processing, the method comprising:
    a) receiving an input signal for one channel from an RF front and;
    b) providing the input signal to a code numerically controlled oscillator (NCO) and a carrier NCO;
    c) using overflows in the code NCO to mark a predetermined code period, thereby forming an accumulation interval and referencing time to sampling in the input signal;
    d) obtaining, from output of the carrier NCO and the code NCO, early, prompt and late phase and quadrature accumulations;
    e) obtaining code offset and Doppler frequency estimates for the one channel;
    f) tracking deviations in code offset and Doppler frequency for the one channel, using the early, prompt and late phase and quadrature accumulations;
    g) obtaining GPS satellite time and code start time from code offset and Doppler frequency information and the input signal; and
    h) repeating steps (a)-(g) until all channels have been processed; wherein all steps are performed asynchronously.

2. The method of claim 1 wherein steps (b)-(g) are performed without clocking, and predetermined frequency ratios are preserved.

3. The method of claim 1 wherein the input signal includes a satellite number and a candidate Doppler frequency.

4. The method of claim 1 wherein the obtaining code offset and Doppler frequency estimates for the one channel comprises:
    determining a correlation power estimate; and
    acquiring the code offset and Doppler frequency estimates when the correlation power estimate is greater than a predetermined threshold.

5. The method of claim 4, wherein the correlation power estimate is given by $I^2+Q^2$, where $$I = \sum_{k=1}^{N} r_{L1}(t_k) X_P(t_k - \hat{\tau}) \cos\{2\pi(f_{IF} + \hat{f}_D)t_k\}$$

$$Q = \sum_{k=1}^{N} r_{L1}(t_k) X_P(t_k - \hat{\tau}) \sin\{2\pi(f_{IF} + \hat{f}_D)t_k\}$$

and where
$\hat{f}_D$ is a candidate Doppler frequency'
$\hat{\tau}$ is a candidate code offset,
$r_{L1}(t_k)$ is a $k^{th}$ sample from the RF front end, and
$f_{IF}$ is an intermediate frequency to which the input signal has been mixed down by the RF front end.

6. The method of claim 1, wherein calculations in the steps (a)-(g) are performed using fixed point arithmetic.

* * * * *